DAVID T. ZEBREE
INVENTOR.

BY Ernest G. Peterson

AGENT

DAVID T. ZEBREE
INVENTOR.

BY Ernest G. Peterson
AGENT

Dec. 10, 1963  D. T. ZEBREE  3,113,519
DELAY FUSE COMPOSITIONS AND INITIATOR
ASSEMBLY CONTAINING SAME
Filed Jan. 26, 1961  4 Sheets-Sheet 4

DAVID T. ZEBREE
INVENTOR.

BY Ernest G. Peterson
AGENT

United States Patent Office 3,113,519
Patented Dec. 10, 1963

3,113,519
DELAY FUSE COMPOSITIONS AND INITIATOR ASSEMBLY CONTAINING SAME
David T. Zebree, Kingston, N.Y., assignor to Hercules Powder Company, Wilmington, Del., a corporation of Delaware
Filed Jan. 26, 1961, Ser. No. 85,011
14 Claims. (Cl. 102—28)

This invention relates to barium peroxide-tellurium-selenium delay fuse compositions which exhibit unpredicted long burning times. In one aspect this invention relates to barium peroxide-tellurium-selenium delay fuse compositions in which the components are in critical ranges of relative proportions providing unexpectedly longer burning times than those obtained when either tellurium or selenium, alone, is burned with barium peroxide. In another aspect this invention relates to delay electric blasting caps which contain the above described barium peroxide-tellurium-selenium compositions, as the delay fuse, to provide for burning times per length of fuse longer than those that have been contemplated heretofore for barium peroxide-selenium-tellurium fuse compositions, whereby a correspondingly shorter length of delay fuse can be utilized for accomplishing the burning times of barium peroxide-selenium-tellurium delay fuse compositions contemplated in the prior art or, alternatively, a longer delay for a given fuse length can be obtained than has been possible with the said prior art compositions. This application is a continuation-in-part of my copending application Serial No. 699,489, filed November 29, 1957, now abandoned.

Delay fuse compositions are applied in numerous applications as media through which an explosive or deflagrating material, as a base charge, is initiated, in order to provide a desired delay between the initial firing and initiation of the base charge.

As applied to a blasting cap, which contains a base charge of a detonating explosive, a heat-sensitive primer superposed on the base charge and an ignition charge above the primer, the delay fuse is disposed between the ignition and primer charge and exhibits a rate of burning such that a specified time interval lapses between the initial firing and the explosion of the primer charge. Delay fuse compositions as applied to blasting caps are generally contained as a core in a metal tube of such lengths as will afford the desired delay.

Squibs, as a flame-producing means, are similar to detonators except that they are employed to initiate deflagrating explosives such as black powder, as the base charge.

As set forth in U.S. Re. 19,661 now expired, delay fuse compositions comprising barium peroxide and at least one of selenium, tellurium, and sulfur have had wide use in the art for some time, not only in view of their firing characteristics, but also because they fire without evolving any substantial amount of gas upon burning. This latter characteristic eliminates development of deleterious pressure within the cap to produce premature detonation and also eliminates development of gas pressure with bursting of the shell and concomitant failure of the shot.

Barium peroxide-tellurium fuse mixtures are, at most barium peroxide contents, slower burning than are barium peroxide-selenium mixtures, due to the difference in reactivity of the fuels. Longer delay periods can, therefore, generally be obtained by burning barium peroxide-tellurium delay fuses. In all instances burning rates of the two compositions are different, and mixtures of tellurium and selenium burned with barium peroxide have burning rates intermediate those obtained when tellurium or selenium is burned alone with barium peroxide, as would be expected.

Many delay fuse specifications call for delay elements of limited length and still require rather long burning times. This has often ruled out the use of barium peroxide-selenium, barium peroxide-tellurium and barium peroxide-tellurium-selenium mixtures so that it has been necessary in such instances to utilize some other delay fuse composition.

I have discovered a limited class of barium peroxide-tellurium-selenium mixtures, which provides burning times markedly longer than those obtained by burning either tellurium or selenium alone with barium peroxide or obtained within the intermediate burning time range above referred to. Accordingly, the invention in providing barium peroxide-tellurium-selenium compositions exhibiting longer burning times than heretofore provides also for delay fuses, formed from these compositions, in shorter lengths for yielding conventional burning times or alternatively exhibiting longer burning times when employed in conventional lengths.

Figures 15, 16:
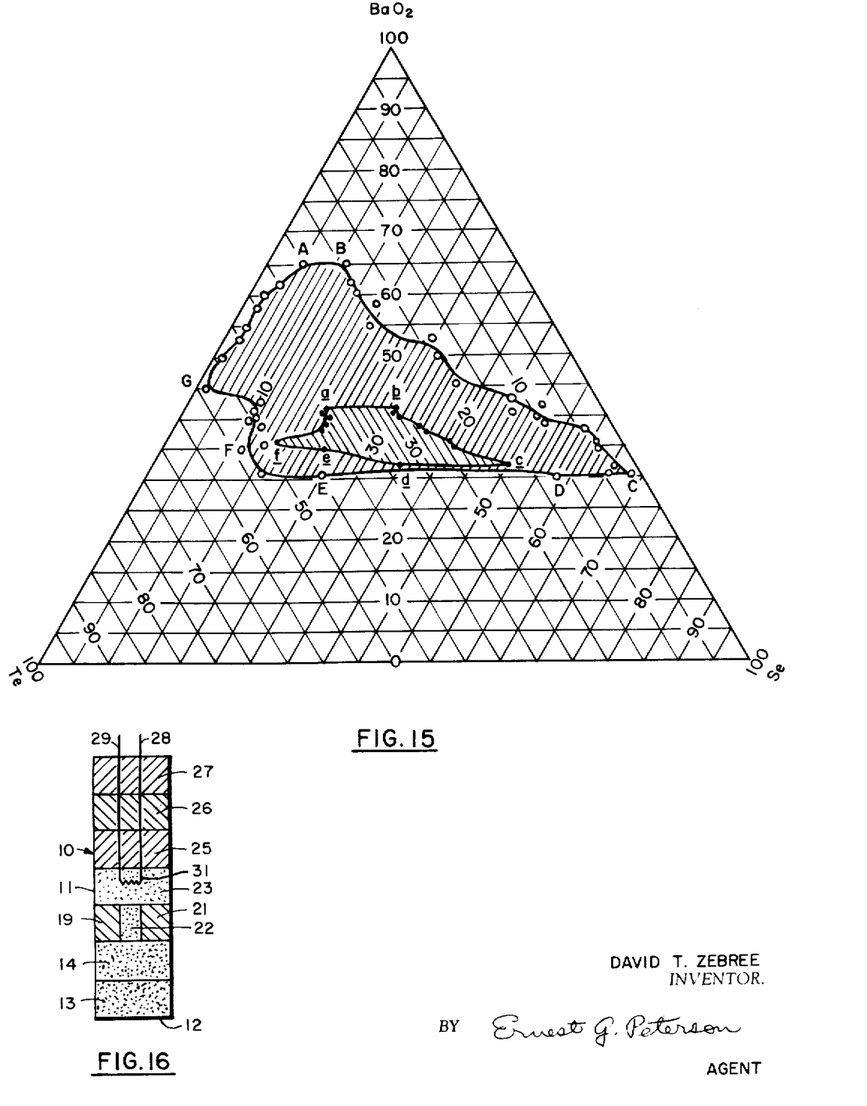
FIG. 15 is a plot on triangular coordinates which defines the barium peroxide-tellurium-selenium delay fuse compositions of the invention with reference to the areas ABCDEFG and *abcdef*.
FIG. 16 is a front elevational view, in cross section, of a delay blasting cap in which delay fuse compositions of the invention are advantageously employed.

In accordance with the invention, barium peroxide-selenium-tellurium delay fuse compositions are provided, which, at the same time barium peroxide content, exhibit burning times longer than those intermediate the burning times of barium peroxide-selenium and barium peroxide-tellurium fuse mixtures and are at least 10 percent longer than those of either the said barium peroxide-selenium or barium peroxide-tellurium mixtures, the said barium peroxide-selenium-tellurium fuse compositions consisting of barium peroxide, selenium and tellurium in those relative proportions defined by the area ABCDEFG of FIG. 15 of the appended drawings.

Further in accordance with the invention, delay electric blasting caps are provided which contain a barium peroxide-selenium-tellurium composition above described as the delay fuse, thereby exhibiting delay times per inch of fuse length longer than that characteristic of barium peroxide-selenium-tellurium delay fuse compositions contemplated in the prior art.

The invention is illustrated with reference to the drawings of which FIG. 1 graphically depicts burning times of separate barium peroxide-tellurium (curve 1) and barium peroxide-selenium (curve 2) delay fuse mixtures.

Figure 1:
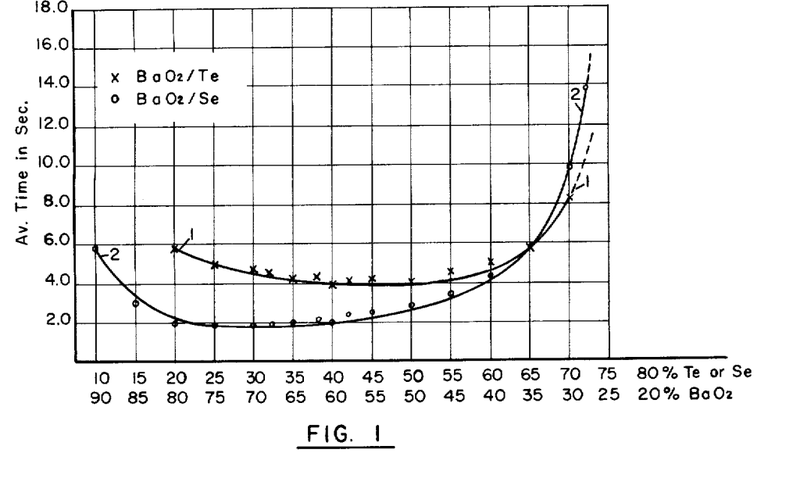
Figure 2:
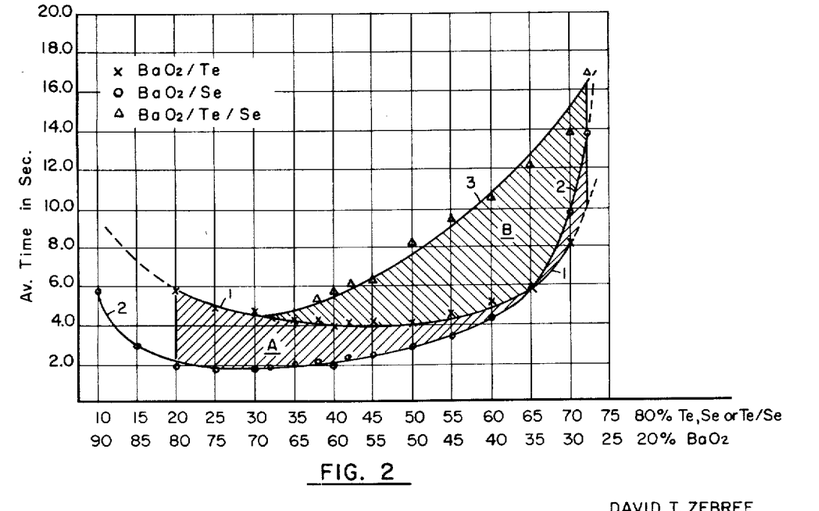
FIG. 2 contains the same two curves and also shows (1) the intermediate area A of burning times normally expected from burning mixtures of tellurium and selenium with barium peroxide as a delay fuse and (2) the external area B which defines the unpredicted burning times of the barium peroxide-tellurium-selenium mixtures of the invention.

As shown by FIGS. 1 and 2, and as more specifically brought out by FIG. 2, tellurium, at most barium peroxide content levels, is a much slower burning fuel than is selenium. There is, therefore, a large area, i.e., the crosshatched area A, intermediate the two curves. It is, of course, to be expected that any mixture of tellurium and selenium, as the fuel for barium peroxide, would burn to provide times within the area A, as illustrated by the burning times obtained at the 70 and 75 percent barium peroxide levels of FIGS. 3 and 4, and at the higher barium peroxide levels shown in Table 1. However, the invention is based on the discovery that, when burning mixtures of tellurium and selenium as the fuel in a barium peroxide delay fuse composition containing from 30 to 65 percent by weight of barium peroxide and when the barium peroxide, tellurium and selenium components are in certain proportions as defined hereinafter, the burning times are greater than those of either of the barium peroxide-tellurium or barium peroxide-selenium mixtures and that they are in the area B of FIG. 2. The specific tellurium-selenium ratios at any of the points on curve 3 of FIG. 2 can be read from Table 1 herein or from the appropriate curve of FIGS. 3-14, the specific point on curve 3 of FIG. 2 in all instances being that of the maximum burning time noted.

It is also to be noted that even though curves 1 and 2 of FIGS. 1 and 2 cross so that in one portion of the area A (below 35 percent barium peroxide), the barium peroxide-tellurium mixtures are faster burning than the barium peroxide-selenium, any barium peroxide-tellurium-selenium mixture should still be expected to burn within the intermediate area A. However, as is shown in FIG. 2, the unpredicted burning times are outside all points in the area A regardless of the point at which the curves cross.

The barium peroxide-tellurium-selenium compositions of the invention, in its broadest aspects, are, therefore, those which contain barium peroxide-tellurium and selenium in proportions for yielding burning times within the area B of FIG. 2.

The points along which the curves of FIGS. 3-14 were plotted were obtained by firing a number of delay electric blasting caps containing barium peroxide-tellurium, or barium peroxide-selenium, or barium peroxide-tellurium-selenium as the delay fuse composition. Each cap consisted of a bronze shell 38/64 inches in length by 0.259-0.256 inch I.D. (tapered), containing 0.40 gram of PETN (pentaerythritol tetranitrate) as the base charge pressed in at 4000 p.s.i.g., 0.30 gram of diazodinitrophenol as the primer charge pressed superposed on the base charge at 1000 p.s.i.g., a lead tube 62/64 inch in length with a 0.256 inch diameter perforation, snugly fitted in the shell superposed on the primer, and the resulting core of delay fuse consisting of 0.9 gram of the delay fuse composition tested. 0.7 gram of lead-selenium in stoichiometric proportions was employed as a loose ignition mixture superposed on the delay fuse. A platinum alloy bridgewire with copper lead wires, a sulfur composition ignition plug, an asphalt waterproofing above the plug, and sulfur seal, or topping, completed the assembly. Each shot was fired at a voltage in the order of about 110 volts and a current in the order of about 2 amps. Five caps were fired in each test except when otherwise indicated. The results of the tests are summarized in Table 1 as follows:

TABLE 1

| Fuse Powder, Wt. Percent | | | Average Burning Time, Secs. |
|---|---|---|---|
| $BaO_2$ | Te | Se | |
| 90 | 10 | 0 | 5F |
| 90 | 9 | 1 | 5F |
| 90 | 7 | 3 | 5F |
| 90 | 5 | 5 | 5F |
| 90 | 2 | 8 | 5F |
| 90 | 1 | 9 | 2F(6.79) |
| 90 | 0 | 10 | 5.78 |

See footnote at end of table.

TABLE 1—Continued

| Fuse Powder, Wt. Percent | | | Average Burning Time, Secs. |
|---|---|---|---|
| $BaO_2$ | Te | Se | |
| 85 | 15 | 0 | 5F |
| 85 | 14 | 1 | 5F |
| 85 | 13 | 2 | 5F |
| 85 | 12 | 3 | 5.37 |
| 85 | 11 | 4 | 4.94 |
| 85 | 10 | 5 | 4.57 |
| 85 | 9 | 6 | 4.08 |
| 85 | 8 | 7 | 4.11 |
| 85 | 7 | 8 | 3.91 |
| 85 | 6 | 9 | 3.75 |
| 85 | 5 | 10 | 3.98 |
| 85 | 3 | 12 | 3.54 |
| 85 | 0 | 15 | 3.00 |
| 80 | 20 | 0 | 5.76 |
| 80 | 19 | 1 | 5.20 |
| 80 | 18 | 2 | 4.74 |
| 80 | 17 | 3 | 4.28 |
| 80 | 16 | 4 | 4.09 |
| 80 | 15 | 5 | 3.78 |
| 80 | 14 | 6 | 3.65 |
| 80 | 13 | 7 | 3.42 |
| 80 | 12 | 8 | 3.29 |
| 80 | 10 | 10 | 3.22 |
| 80 | 5 | 15 | 2.66 |
| 80 | 0 | 20 | 1.93 |
| 75 | 25 | 0 | 4.90 |
| 75 | 24 | 1 | 4.43 |
| 75 | 23 | 2 | 4.16 |
| 75 | 22 | 3 | 4.01 |
| 75 | 21 | 4 | 4.00 |
| 75 | 20 | 5 | 3.91 |
| 75 | 19 | 6 | 3.88 |
| 75 | 18 | 7 | 3.83 |
| 75 | 17 | 8 | 3.63 |
| 75 | 15 | 10 | 3.46 |
| 75 | 11 | 14 | 3.15 |
| 75 | 0 | 25 | 1.82 |
| 70 | 30 | 0 | 4.68 |
| 70 | 29 | 1 | 4.49 |
| 70 | 28 | 2 | 4.30 |
| 70 | 27 | 3 | 4.14 |
| 70 | 26 | 4 | 4.31 |
| 70 | 25 | 5 | 4.37 |
| 70 | 24 | 6 | 4.42 |
| 70 | 23 | 7 | 4.28 |
| 70 | 22 | 8 | 4.27 |
| 70 | 20 | 10 | 3.98 |
| 70 | 16 | 14 | 3.44 |
| 70 | 0 | 30 | 1.82 |
| 68 | 32 | 0 | 4.47 |
| 68 | 31 | 1 | 4.30 |
| 68 | 30 | 2 | 4.27 |
| 68 | 29 | 3 | 4.19 |
| 68 | 28 | 4 | 4.25 |
| 68 | 27 | 5 | 4.41 |
| 68 | 26 | 6 | 4.55 |
| 68 | 25 | 7 | 4.33 |
| 68 | 24 | 8 | 4.25 |
| 68 | 22 | 10 | 4.11 |
| 68 | 18 | 14 | 3.73 |
| 68 | 7 | 25 | 2.55 |
| 68 | 0 | 32 | 1.87 |
| 65 | 35 | 0 | 4.21 |
| 65 | 34 | 1 | 4.20 |
| 65 | 33 | 2 | 4.26 |
| 65 | 32 | 3 | 4.34 |
| 65 | 31 | 4 | 4.49 |
| 65 | 30 | 5 | 4.91 |
| 65 | 28 | 7 | 4.97 |
| 65 | 27 | 8 | 4.88 |
| 65 | 25 | 10 | 4.71 |
| 65 | 24 | 11 | 4.83 |
| 65 | 23 | 12 | 4.59 |
| 65 | 21 | 14 | 4.11 |
| 65 | 15 | 20 | 3.54 |
| 65 | 10 | 25 | 2.92 |
| 65 | 0 | 35 | 2.02 |
| 62 | 38 | 0 | 4.33 |
| 62 | 36 | 2 | 4.59 |
| 62 | 35 | 3 | 5.64 |
| 62 | 34 | 4 | 4.96 |
| 62 | 32 | 6 | 5.22 |
| 62 | 30 | 8 | 5.23 |
| 62 | 28 | 10 | 5.09 |
| 62 | 27 | 11 | 5.00 |
| 62 | 26 | 12 | 4.99 |
| 62 | 25 | 13 | 4.80 |
| 62 | 24 | 14 | 4.52 |
| 62 | 18 | 20 | 3.50 |
| 62 | 13 | 25 | 3.10 |
| 62 | 8 | 30 | 2.74 |
| 62 | 0 | 38 | 2.06 |
| 60 | 40 | 0 | 3.91 |
| 60 | 39 | 1 | 4.17 |
| 60 | 38 | 2 | 4.53 |
| 60 | 36 | 4 | 4.97 |

TABLE 1—Continued

| Fuse Powder, Wt. Percent | | | Average Burning Time, Secs. |
|---|---|---|---|
| BaO$_2$ | Te | Se | |
| 60 | 35 | 5 | 5.59 |
| 60 | 34 | 6 | 5.68 |
| 60 | 33 | 7 | 5.59 |
| 60 | 32 | 8 | 5.47 |
| 60 | 30 | 10 | 5.17 |
| 60 | 28 | 12 | 5.02 |
| 60 | 26 | 14 | 4.98 |
| 60 | 25 | 15 | 4.54 |
| 60 | 20 | 20 | 3.88 |
| 60 | 10 | 30 | 2.85 |
| 60 | 0 | 40 | 2.02 |
| 58 | 42 | 0 | 4.11 |
| 58 | 41 | 1 | 4.41 |
| 58 | 40 | 2 | 4.70 |
| 58 | 39 | 3 | 4.90 |
| 58 | 38 | 4 | 5.11 |
| 58 | 37 | 5 | 5.63 |
| 58 | 36 | 6 | 5.82 |
| 58 | 35 | 7 | 5.73 |
| 58 | 34 | 8 | 5.95 |
| 58 | 28 | 14 | 5.04 |
| 58 | 26 | 16 | 5.05 |
| 58 | 24 | 18 | 4.80 |
| 58 | 22 | 20 | 4.55 |
| 58 | 19 | 23 | 4.04 |
| 58 | 12 | 30 | 3.25 |
| 58 | 0 | 42 | 2.36 |
| 55 | 45 | 0 | 4.16 |
| 55 | 44 | 1 | 4.21 |
| 55 | 43 | 2 | 4.71 |
| 55 | 42 | 3 | 5.16 |
| 55 | 41 | 4 | 5.63 |
| 55 | 40 | 5 | 5.98 |
| 55 | 39 | 6 | 5.94 |
| 55 | 38 | 7 | 6.16 |
| 55 | 37 | 8 | 6.21 |
| 55 | 35 | 10 | 5.84 |
| 55 | 31 | 14 | 5.78 |
| 55 | 29 | 16 | 5.44 |
| 55 | 28 | 17 | 5.37 |
| 55 | 27 | 18 | 5.39 |
| 55 | 26 | 19 | 4.87 |
| 55 | 25 | 20 | 4.54 |
| 55 | 20 | 25 | 4.11 |
| 55 | 15 | 30 | 3.63 |
| 55 | 0 | 45 | 2.45 |
| 53 | 47 | 0 | 3.93 |
| 53 | 45 | 2 | 5.22 |
| 53 | 43 | 4 | 7.71 |
| 53 | 42 | 5 | 8.10 |
| 53 | 41 | 6 | 8.08 |
| 53 | 40 | 7 | 8.09 |
| 53 | 39 | 8 | 7.96 |
| 53 | 37 | 10 | 7.57 |
| 53 | 27 | 20 | 5.32 |
| 53 | 18 | 29 | 4.99 |
| 53 | 17 | 30 | 4.25 |
| 53 | 0 | 47 | 2.68 |
| 50 | 50 | 0 | 4.06 |
| 50 | 49 | 1 | 4.84 |
| 50 | 48 | 2 | 5.73 |
| 50 | 47 | 3 | 6.97 |
| 50 | 46 | 4 | 6.71 |
| 50 | 45 | 5 | 7.20 |
| 50 | 44 | 6 | 7.35 |
| 50 | 43 | 7 | 8.08 |
| 50 | 42 | 8 | 7.72 |
| 50 | 40 | 10 | 7.35 |
| 50 | 36 | 14 | 6.45 |
| 50 | 22 | 28 | 4.85 |
| 50 | 20 | 30 | 4.84 |
| 50 | 18 | 32 | 4.94 |
| 50 | 16 | 34 | 4.26 |
| 50 | 14 | 36 | 4.39 |
| 50 | 12 | 38 | 3.81 |
| 50 | 10 | 40 | 3.71 |
| 50 | 0 | 50 | 2.86 |
| 45 | 55 | 0 | 4.59 |
| 45 | 54 | 1 | 4.55 |
| 45 | 53 | 2 | 6.31 |
| 45 | 51 | 4 | 8.52 |
| 45 | 49 | 6 | 9.37 |
| 45 | 45 | 10 | 8.76 |
| 45 | 39 | 16 | 7.77 |
| 45 | 37 | 18 | 7.36 |
| 45 | 35 | 20 | 6.39 |
| 45 | 20 | 35 | 5.30 |
| 45 | 18 | 37 | 5.36 |
| 45 | 16 | 39 | 4.15 |
| 45 | 0 | 55 | 3.44 |
| 43 | 57 | 0 | 4.62 |
| 43 | 56 | 1 | 4.57 |
| 43 | 55 | 2 | 7.56 |
| 43 | 54 | 3 | 8.72 |
| 43 | 53 | 4 | 5F |
| 43 | 52 | 5 | 5F |
| 43 | 51 | 6 | 5F |
| 43 | 50 | 7 | 5F |
| 43 | 49 | 8 | 5F |
| 43 | 47 | 10 | 10.37 |
| 43 | 45 | 12 | 9.63 |
| 43 | 42 | 15 | 8.64 |
| 43 | 39 | 18 | 8.17 |
| 43 | 37 | 20 | 7.62 |
| 43 | 32 | 25 | 7.33 |
| 43 | 27 | 30 | 6.93 |
| 43 | 25 | 32 | 6.63 |
| 43 | 22 | 35 | 6.70 |
| 43 | 17 | 40 | 6.16 |
| 43 | 12 | 45 | 5.52 |
| 43 | 10 | 47 | 5.05 |
| 43 | 7 | 50 | 4.61 |
| 43 | 4 | 53 | 4.34 |
| 43 | 0 | 57 | 3.78 |
| 42 | 58 | 0 | 4.70 |
| 42 | 56 | 2 | 7.03 |
| 42 | 54 | 4 | 5F |
| 42 | 53 | 5 | 5F |
| 42 | 52 | 6 | 5F |
| 42 | 51 | 7 | 5F |
| 42 | 50 | 8 | 5F |
| 42 | 49 | 9 | 1F(11.59) |
| 42 | 48 | 10 | 11.04 |
| 42 | 47 | 11 | 10.57 |
| 42 | 46 | 12 | 10.26 |
| 42 | 45 | 13 | 9.66 |
| 42 | 44 | 14 | 9.29 |
| 42 | 43 | 15 | 9.08 |
| 42 | 42 | 16 | 8.91 |
| 42 | 40 | 18 | 8.24 |
| 42 | 38 | 20 | 8.13 |
| 42 | 36 | 22 | 7.86 |
| 42 | 34 | 24 | 7.67 |
| 42 | 32 | 26 | 7.69 |
| 42 | 30 | 28 | 7.49 |
| 42 | 28 | 30 | 7.41 |
| 42 | 26 | 32 | 7.13 |
| 42 | 24 | 34 | 7.08 |
| 42 | 22 | 36 | 6.66 |
| 42 | 20 | 38 | 6.65 |
| 42 | 19 | 39 | 6.47 |
| 42 | 18 | 40 | 6.22 |
| 42 | 16 | 42 | 6.12 |
| 42 | 12 | 46 | 5.73 |
| 42 | 8 | 50 | 5.35 |
| 42 | 5 | 53 | 4.93 |
| 42 | 2 | 56 | 4.52 |
| 42 | 0 | 58 | 4.15 |
| 41 | 59 | 0 | 5.41 |
| 41 | 58 | 1 | 5.92 |
| 41 | 57 | 2 | 8.42 |
| 41 | 56 | 3 | 5F |
| 41 | 50 | 9 | 3F(11.47) |
| 41 | 49 | 10 | 1F(11.59) |
| 41 | 48 | 11 | 10.76 |
| 41 | 47 | 12 | 10.10 |
| 41 | 46 | 13 | 9.82 |
| 41 | 45 | 14 | 9.52 |
| 41 | 44 | 15 | 9.41 |
| 41 | 43 | 16 | 8.91 |
| 41 | 41 | 18 | 8.50 |
| 41 | 39 | 20 | 8.30 |
| 41 | 37 | 22 | 8.08 |
| 41 | 35 | 24 | 7.95 |
| 41 | 33 | 26 | 7.96 |
| 41 | 31 | 28 | 7.96 |
| 41 | 29 | 30 | 7.78 |
| 41 | 27 | 32 | 7.31 |
| 41 | 25 | 34 | 7.41 |
| 41 | 23 | 36 | 6.87 |
| 41 | 21 | 38 | 6.83 |
| 41 | 19 | 40 | 6.65 |
| 41 | 13 | 46 | 5.98 |
| 41 | 7 | 52 | 5.12 |
| 41 | 3 | 56 | 4.63 |
| 41 | 0 | 59 | 4.13 |
| 40 | 60 | 0 | 5.05 |
| 40 | 58 | 2 | *8.09 |
| 40 | 57 | 3 | *5F(9.44) |
| 40 | 56 | 4 | *9F(10.38) |
| 40 | 55 | 5 | 5F |
| 40 | 54 | 6 | 5F |
| 40 | 53 | 7 | *2F(10.63) |
| 40 | 52 | 8 | 4F(11.09) |
| 40 | 51 | 9 | 5F |
| 40 | 50 | 10 | 10.38 |
| 40 | 48 | 12 | 9.32 |
| 40 | 46 | 14 | 8.97 |
| 40 | 44 | 16 | 8.60 |
| 40 | 42 | 18 | 8.50 |
| 40 | 40 | 20 | 8.27 |
| 40 | 38 | 22 | 8.24 |
| 40 | 36 | 24 | 8.10 |
| 40 | 34 | 26 | 7.70 |
| 40 | 32 | 28 | 7.82 |
| 40 | 30 | 30 | 7.55 |

See footnote at end of table.

TABLE 1—Continued

| Fuse Powder, Wt. Percent | | | Average Burning Time, Secs. |
|---|---|---|---|
| BaO$_2$ | Te | Se | |
| 40 | 28 | 32 | 7.53 |
| 40 | 26 | 34 | 7.24 |
| 40 | 22 | 38 | 6.90 |
| 40 | 20 | 40 | 6.74 |
| 40 | 17 | 43 | 6.88 |
| 40 | 16 | 44 | 6.87 |
| 40 | 15 | 45 | 6.40 |
| 40 | 10 | 50 | 5.83 |
| 40 | 8 | 52 | 5.40 |
| 40 | 7 | 53 | 5.47 |
| 40 | 5 | 55 | 5.02 |
| 40 | 0 | 60 | 4.33 |
| 39 | 61 | 0 | 5.06 |
| 39 | 60 | 1 | 6.62 |
| 39 | 59 | 2 | 2F(11.01) |
| 39 | 58 | 3 | 5F |
| 39 | 51 | 10 | 2F(12.17) |
| 39 | 50 | 11 | 12.27 |
| 39 | 49 | 12 | 11.76 |
| 39 | 48 | 13 | 10.93 |
| 39 | 47 | 14 | 10.89 |
| 39 | 46 | 15 | 10.36 |
| 39 | 45 | 16 | 10.10 |
| 39 | 44 | 17 | 9.94 |
| 39 | 43 | 18 | 9.45 |
| 39 | 42 | 19 | 9.33 |
| 39 | 41 | 20 | 9.20 |
| 39 | 39 | 22 | 8.78 |
| 39 | 37 | 24 | 8.59 |
| 39 | 35 | 26 | 8.75 |
| 39 | 33 | 28 | 8.55 |
| 39 | 31 | 30 | 8.66 |
| 39 | 29 | 32 | 8.80 |
| 39 | 27 | 34 | 8.49 |
| 39 | 25 | 36 | 7.98 |
| 39 | 23 | 38 | 7.86 |
| 39 | 19 | 42 | 7.41 |
| 39 | 15 | 46 | 6.95 |
| 39 | 9 | 52 | 6.15 |
| 39 | 5 | 56 | 5.55 |
| 39 | 3 | 58 | 5.02 |
| 39 | 0 | 61 | 4.77 |
| 38 | 62 | 0 | 5.28 |
| 38 | 61 | 1 | 7.66 |
| 38 | 60 | 2 | 4F(9.77) |
| 38 | 59 | 3 | 5F |
| 38 | 58 | 4 | 5F |
| 38 | 57 | 5 | 5F |
| 38 | 56 | 6 | 5F |
| 38 | 55 | 7 | 5F |
| 38 | 54 | 8 | 5F |
| 38 | 53 | 9 | 5F |
| 38 | 52 | 10 | 4F(12.34) |
| 38 | 51 | 11 | 2F(12.12) |
| 38 | 50 | 12 | 11.92 |
| 38 | 49 | 13 | 11.41 |
| 38 | 48 | 14 | 10.61 |
| 38 | 47 | 15 | 10.10 |
| 38 | 46 | 16 | 10.39 |
| 38 | 44 | 18 | 10.06 |
| 38 | 42 | 20 | 9.43 |
| 38 | 40 | 22 | 9.03 |
| 38 | 38 | 24 | 8.98 |
| 38 | 36 | 26 | 9.18 |
| 38 | 34 | 28 | 8.95 |
| 38 | 32 | 30 | 8.93 |
| 38 | 30 | 32 | 8.75 |
| 38 | 28 | 34 | 8.65 |
| 38 | 26 | 36 | 8.56 |
| 38 | 24 | 38 | 8.49 |
| 38 | 22 | 40 | 8.13 |
| 38 | 20 | 42 | 7.78 |
| 38 | 16 | 46 | 7.56 |
| 38 | 12 | 50 | 6.93 |
| 38 | 8 | 54 | 6.66 |
| 38 | 4 | 58 | 5.88 |
| 38 | 0 | 62 | 5.15 |
| 36 | 64 | 0 | 5.37 |
| 36 | 63 | 1 | 7.61 |
| 36 | 62 | 2 | 5F |
| 36 | 61 | 3 | 5F |
| 36 | 60 | 4 | 5F |
| 36 | 58 | 6 | 5F |
| 36 | 56 | 8 | 5F |
| 36 | 54 | 10 | 5F |
| 36 | 52 | 12 | 1F(12.83) |
| 36 | 50 | 14 | 11.97 |
| 36 | 48 | 16 | 9.77 |
| 36 | 44 | 20 | 10.57 |
| 36 | 39 | 25 | 9.90 |
| 36 | 34 | 30 | 10.17 |
| 36 | 29 | 35 | 10.24 |
| 36 | 24 | 40 | 9.73 |
| 36 | 19 | 45 | 9.18 |
| 36 | 14 | 50 | 8.39 |
| 36 | 9 | 55 | 7.53 |
| 36 | 4 | 60 | 6.91 |
| 36 | 3 | 61 | 6.83 |
| 36 | 0 | 64 | 6.11 |
| 35 | 65 | 0 | 5.81 |
| 35 | 64 | 1 | 5F |
| 35 | 63 | 2 | 5F |
| 35 | 62 | 3 | 5F |
| 35 | 61 | 4 | 5F |
| 35 | 57 | 8 | 5F |
| 35 | 56 | 9 | 5F |
| 35 | 55 | 10 | 5F |
| 35 | 54 | 11 | 5F |
| 35 | 53 | 12 | 11.98 |
| 35 | 49 | 16 | 11.03 |
| 35 | 47 | 18 | 11.30 |
| 35 | 45 | 20 | 9.84 |
| 35 | 42 | 23 | 10.16 |
| 35 | 40 | 25 | 10.35 |
| 35 | 37 | 28 | 10.45 |
| 35 | 35 | 30 | 10.91 |
| 35 | 32 | 33 | 10.88 |
| 35 | 30 | 35 | 10.65 |
| 35 | 28 | 37 | 10.40 |
| 35 | 26 | 39 | 10.86 |
| 35 | 23 | 42 | 10.54 |
| 35 | 20 | 45 | 9.52 |
| 35 | 18 | 47 | 9.45 |
| 35 | 15 | 50 | 9.37 |
| 35 | 13 | 52 | 9.08 |
| 35 | 11 | 54 | 8.65 |
| 35 | 10 | 55 | 8.67 |
| 35 | 5 | 60 | 7.45 |
| 35 | 3 | 62 | 6.97 |
| 35 | 0 | 65 | 5.84 |
| 32 | 68 | 0 | 3F(8.30) |
| 32 | 67 | 1 | 5F |
| 32 | 66 | 2 | 5F |
| 32 | 65 | 3 | 5F |
| 32 | 63 | 5 | 5F |
| 32 | 58 | 10 | 5F |
| 32 | 53 | 15 | 3F(13.81) |
| 32 | 51 | 17 | 13.50 |
| 32 | 50 | 18 | 13.16 |
| 32 | 48 | 20 | 12.70 |
| 32 | 43 | 25 | 11.50 |
| 32 | 38 | 30 | 12.45 |
| 32 | 33 | 35 | 12.96 |
| 32 | 28 | 40 | 13.57 |
| 32 | 23 | 45 | 13.42 |
| 32 | 18 | 50 | 12.90 |
| 32 | 13 | 55 | 12.43 |
| 32 | 8 | 60 | 10.56 |
| 32 | 3 | 65 | 9.92 |
| 32 | 0 | 68 | 8.86 |
| 31 | 69 | 0 | 5F |
| 31 | 68 | 1 | 5F |
| 31 | 67 | 2 | 5F |
| 31 | 66 | 3 | 5F |
| 31 | 65 | 4 | 5F |
| 31 | 61 | 8 | 5F |
| 31 | 57 | 12 | 5F |
| 31 | 53 | 16 | 5F |
| 31 | 49 | 20 | 5F |
| 31 | 44 | 25 | 12.14 |
| 31 | 39 | 30 | 13.31 |
| 31 | 34 | 35 | 13.98 |
| 31 | 29 | 40 | 15.28 |
| 31 | 24 | 45 | 16.22 |
| 31 | 19 | 50 | 16.87 |
| 31 | 15 | 54 | 15.04 |
| 31 | 13 | 56 | 14.07 |
| 31 | 9 | 60 | 13.05 |
| 31 | 4 | 65 | 11.20 |
| 31 | 0 | 69 | 9.55 |
| 30 | 70 | 0 | 5F |
| 30 | 69 | 1 | 5F |
| 30 | 68 | 2 | 5F |
| 30 | 67 | 3 | 5F |
| 30 | 62 | 8 | 5F |
| 30 | 58 | 12 | 5F |
| 30 | 54 | 16 | 3F(13.67) |
| 30 | 50 | 20 | 1F(12.83) |
| 30 | 45 | 25 | 1F(14.01) |
| 30 | 40 | 30 | 14.86 |
| 30 | 35 | 35 | 15.32 |
| 30 | 30 | 40 | 17.46 |
| 30 | 25 | 45 | 1F(20.47) |
| 30 | 20 | 50 | 2F(17.73) |
| 30 | 18 | 52 | 2F(17.77) |
| 30 | 16 | 54 | 1F(13.86) |
| 30 | 15 | 55 | 1F(19.44) |
| 30 | 12 | 58 | 16.21 |
| 30 | 10 | 60 | 15.67 |
| 30 | 8 | 62 | 13.13 |
| 30 | 5 | 65 | 12.01 |
| 30 | 2 | 68 | 11.09 |
| 30 | 0 | 70 | 9.90 |
| 28 | 72 | 0 | 5F |
| 28 | 70 | 2 | 5F |
| 28 | 68 | 4 | 5F |
| 28 | 66 | 6 | 5F |
| 28 | 64 | 8 | 5F |

See footnote at end of table.

TABLE 1—Continued

| Fuse Powder, Wt. Percent | | | Average Burning Time, Secs. |
|---|---|---|---|
| BaO₂ | Te | Se | |
| 28 | 60 | 12 | 5F |
| 28 | 56 | 16 | 5F |
| 28 | 54 | 18 | 5F |
| 28 | 52 | 20 | 5F |
| 28 | 50 | 22 | 5F |
| 28 | 48 | 24 | 12.49 |
| 28 | 42 | 30 | 12.68 |
| 28 | 32 | 40 | 16.79 |
| 28 | 28 | 44 | 5F |
| 28 | 26 | 46 | 4F(18.73) |
| 28 | 24 | 48 | 5F |
| 28 | 22 | 50 | 5F |
| 28 | 12 | 60 | 5F |
| 28 | 0 | 72 | 13.87 |

*10 tested.
F = Failed.

Plots of data from the above tabulation not specifically shown in FIGS. 3–14, i.e., at several barium peroxide levels greater than 75 percent, are nevertheless clearly indicated in the said tabulation.

Figure 3:
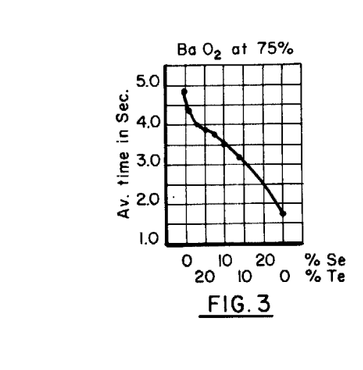
FIGS. 3–14 are plots of burning time versus barium peroxide-tellurium-selenium delay fuse composition further demonstrating the unpredicted burning times obtained in the practice of the invention.
Figure 4:
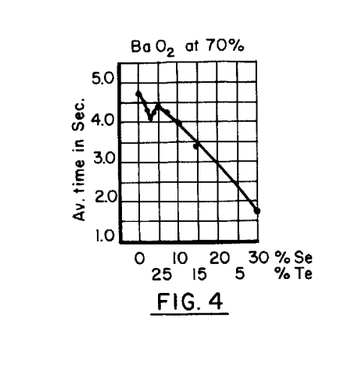
Figure 5:
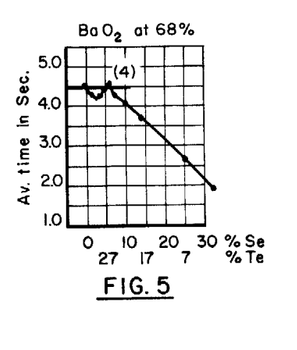
Figure 6:
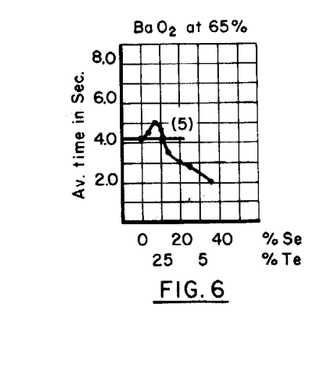
Figure 7:
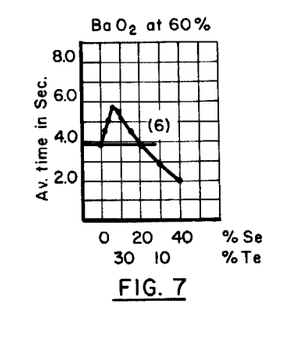
Figure 8:
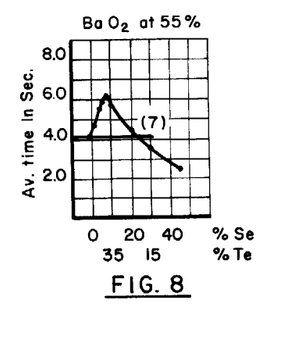
Figure 9:
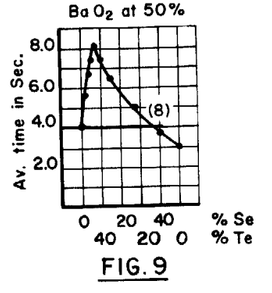
Figure 10:
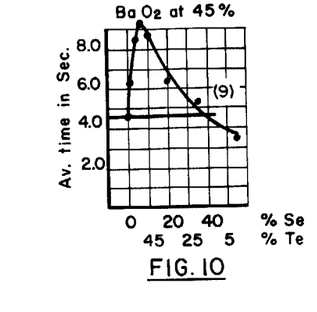
Figure 11:
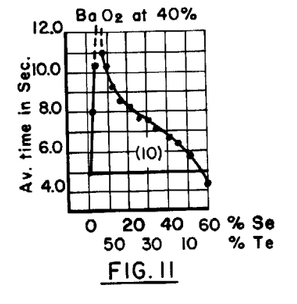
Figure 12:
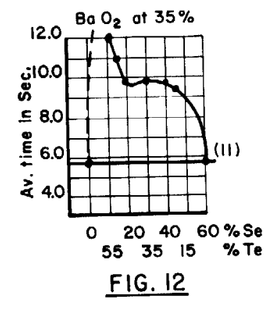
Figure 13:
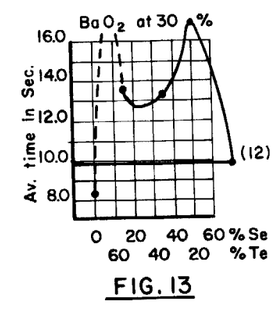
Figure 14:
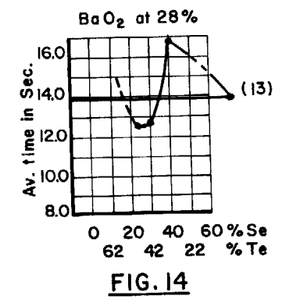

As demonstrated with reference to FIGS. 3 and 4, at barium peroxide levels above 68 percent, burning time is shorter with increasing selenium content. In FIG. 4, there is a slight increase in burning time after about 3–5 percent selenium has been added but even in that case, the burning time does not exceed that of the barium peroxide-tellurium mixture, i.e., at zero percent selenium. However, at the 68 percent barium peroxide level, a burning time longer than the slowest time encountered with barium peroxide-tellurium mixture was obtained, namely, 4.55 seconds at a 6 percent selenium content.

As demonstrated by the plots of FIGS. 5–14, unpredicted burning time values were obtained at barium peroxide content levels from 68 percent down to 28 percent. Thus, the points above the horizontal lines 4–13, respectively, of FIGS. 5–14 are those which illustrate the compositions of the invention. Curve 3 of FIG. 2 is a plot of the maximum points above the said horizontal lines and defines the extremity of the area B of FIG. 2.

Although all barium peroxide-selenium-tellurium compositions within the area B of FIG. 2 are characterized by unpredicted long burning times and are within the scope of the invention in its broadest form, it is preferred from the standpoint of practicability, i.e., so far as material advantages are concerned, to claim only those compositions which exhibit burning times at least 10 percent longer than those obtained from burning barium peroxide-tellurium or barium peroxide-selenium mixtures at the same barium peroxide content level. At certain barium peroxide levels, as demonstrated with reference to Table 1, I have discovered that the barium peroxide-selenium-tellurium compositions exhibit a certain degree of unreliability up to a point at which the increase in burning time provided is in considerable excess of the above said 10 percent value. This is evidenced by the failures (F) obtained in those instances.

The reason for this behaviour is not clear. However, the invention is inclusive only of those barium peroxide-selenium-tellurium compositions which not only provide for unpredicted long burning times but also exhibit complete reliability of performance so that in a number of instances the burning times contemplated are in considerable excess of the minimum 10 percent increase above described.

The compositions of the invention are defined by the area ABCDEFG of FIG. 15 which is a plot on triangular coordinates of selenium, tellurium and barium peroxide content of those compositions of Table 1 which exhibit the above described increase in burning time together with reliability of performance. Those ranges of component proportions taken from Table 1, and plotted to form the area ABCDEFG are as follows:

TABLE 2

| Area ABCDEFG of Fig. 15, Weight Percent | | |
|---|---|---|
| BaO₂ | Se | Te |
| 65 | 5–12 | 30–23 |
| 62 | 3–13 | 35–25 |
| 60 | 2–15 | 38–25 |
| 58 | 2–18 | 40–24 |
| 55 | 2–19 | 43–26 |
| 53 | 2–29 | 45–18 |
| 50 | 1–32 | 49–18 |
| 45 | 2–37 | 53–18 |
| 43 | 10–45 | 47–12 |
| 42 | 10–50 | 48–8 |
| 41 | 11–46 | 48–13 |
| 40 | 10–50 | 50–10 |
| 39 | 13–52 | 48–9 |
| 38 | 12–58 | 50–4 |
| 36 | 14–61 | 50–3 |
| 35 | 12–62 | 53–3 |
| 32 | 17–65 | 51–3 |
| 31 | 25–65 | 44–4 |
| 30 | 58–68 | 12–2 |

However, a still more preferred class of compositions of the invention are those within the above said area ABCDEFG of FIG. 15, and defined by the area abcdef, which contain from 32–42 percent barium peroxide, in view of the particularly long burning times that these compositions exhibit and their platonic relationship. Thus, these compositions contain at each barium peroxide level a significant range of selenium and tellurium contents which yield a burning time within ±5 percent of the average of that group. These compositions have a relatively flat burning time area, and accordingly, noticeable changes in tellurium to selenium ratio do not appreciably affect their burning times. This is of particular importance in connection with the manufacture of the compositions inasmuch as reproducibility of burning time within desired limits can be maintained with a much greater degree of accuracy in view of the relatively large tolerance in selenium and tellurium proportions that can be afforded to thereby assure a product exhibiting a particularly high degree of consistency in firing time properties.

Table 3, following, is a tabulation of those component proportions of Table 1 which are in the 32–42 barium peroxide content range and which provide the preferred long and platonic burning time values. A double asterisk signifies in each instance the burning time reference value and the single asterisk indicates those values within the ±5 percent range.

TABLE 3

| Fuse Powder, Wt. Percent | | | Average Burning Time, Secs. |
|---|---|---|---|
| BaO₂ | Te | Se | |
| 42 | 40 | 18 | 8.24 |
| 42 | 38 | 20 | *8.13 |
| 42 | 36 | 22 | *7.86 |
| 42 | 34 | 24 | **7.67 |
| 42 | 32 | 26 | *7.69 |
| 42 | 30 | 28 | *7.49 |
| 42 | 28 | 30 | *7.41 |
| 42 | 26 | 32 | 7.13 |
| 41 | 41 | 18 | 8.50 |
| 41 | 39 | 20 | *8.30 |
| 41 | 37 | 22 | **8.08 |
| 41 | 35 | 24 | *7.95 |
| 41 | 33 | 26 | *7.96 |
| 41 | 31 | 28 | *7.96 |
| 41 | 29 | 30 | *7.78 |
| 41 | 27 | 32 | 7.31 |
| 40 | 40 | 20 | 8.27 |
| 40 | 38 | 22 | *8.24 |
| 40 | 36 | 24 | *8.10 |
| 40 | 34 | 26 | *7.70 |
| 40 | 32 | 28 | **7.82 |

See footnote at end of table.

TABLE 3—Continued

| Fuse Powder, Wt. Percent | | | Average Burning Time, Secs. |
|---|---|---|---|
| BaO$_2$ | Te | Se | |
| 40 | 30 | 30 | *7.55 |
| 40 | 28 | 32 | *7.53 |
| 40 | 26 | 34 | 7.24 |
| 39 | 41 | 20 | 9.20 |
| 39 | 39 | 22 | *8.78 |
| 39 | 37 | 24 | *8.59 |
| 39 | 35 | 26 | *8.75 |
| 39 | 33 | 28 | **8.55 |
| 39 | 31 | 30 | *8.66 |
| 39 | 29 | 32 | *8.80 |
| 39 | 27 | 34 | *8.49 |
| 39 | 25 | 36 | 7.98 |
| 38 | 42 | 20 | 9.43 |
| 38 | 40 | 22 | *9.03 |
| 38 | 38 | 24 | *8.98 |
| 38 | 36 | 26 | *9.18 |
| 38 | 34 | 28 | *8.95 |
| 38 | 32 | 30 | **8.93 |
| 38 | 30 | 32 | *8.75 |
| 38 | 28 | 34 | *8.65 |
| 38 | 26 | 36 | *8.56 |
| 38 | 24 | 38 | 8.49 |
| 36 | 50 | 14 | 11.97 |
| 36 | 48 | 16 | *9.77 |
| 36 | 44 | 20 | *10.57 |
| 36 | 39 | 25 | *9.90 |
| 36 | 34 | 30 | **10.17 |
| 36 | 29 | 35 | *10.24 |
| 36 | 24 | 40 | *9.73 |
| 36 | 19 | 45 | 9.18 |
| 35 | 45 | 20 | 9.84 |
| 35 | 42 | 23 | *10.16 |
| 35 | 40 | 25 | *10.35 |
| 35 | 37 | 28 | **10.45 |
| 35 | 35 | 30 | *10.91 |
| 35 | 32 | 33 | *10.88 |
| 35 | 30 | 35 | *10.65 |
| 35 | 26 | 39 | *10.86 |
| 35 | 23 | 42 | *10.54 |
| 35 | 20 | 45 | 9.52 |
| 32 | 38 | 30 | 12.45 |
| 32 | 33 | 35 | *12.96 |
| 32 | 28 | 40 | *13.57 |
| 32 | 23 | 45 | **13.42 |
| 32 | 18 | 50 | *12.90 |
| 32 | 13 | 55 | 12.43 |

*Values representing times within ±5% of desired average (represented by **).

Those ranges of component proportions taken from Table 3 and plotted to form the area *abcdef* of FIG. 15 are as follows:

TABLE 4

| Weight Percent | | |
|---|---|---|
| BaO$_2$ | Se | Te |
| 32 | 35–50 | 33–18 |
| 35 | 23–42 | 42–23 |
| 36 | 16–40 | 48–24 |
| 38 | 22–36 | 40–26 |
| 39 | 22–34 | 39–27 |
| 40 | 22–32 | 38–28 |
| 41 | 20–30 | 39–29 |
| 42 | 20–30 | 38–28 |

Barium peroxide-selenium-tellurium delay fuse compositions of the invention have especial utility as delay fuses in assemblies which, although the assembly requires burning time which can be met by barium peroxide-selenium-tellurium compositions of the prior art, it additionally requires fuse lengths so short that the prior art mixtures cannot yield the required long burning times in such short lengths. By way of further illustration, a barium peroxide-selenium delay fuse mixture commonly used in the art, i.e., 80/20 to 84/16 in a 2½ inch fuse, burns for about 9 seconds, the rate being 3.6 seconds per inch. In contrast, a barium peroxide-tellurium-selenium mixture 40/40/20 in a 1 inch fuse burns for 9 seconds, the time being 9 seconds per inch. Under similar conditions, barium peroxide-tellurium 70/30 mixture as a 2½ inch fuse, burns in about 11 seconds, or at the rate of 4.4 sec./in.

It is, therefore, a feature of the invention that electric delay blasting caps are provided containing delay fuse compositions of the invention thereby providing burning times per inch of fuse element, greater than have been possible for barium peroxide-tellurium-selenium delay fuses heretofore, and either utilizing a shorter length delay fuse for the burning times ordinarily utilized in the art, or a longer burning time in those instances wherein the fuse length is the same as used in the prior art devices.

Referring to FIG. 16, electric delay blasting cap 10 comprises elongated shell 11 containing detonatable base charge 13 presed into closed end 12. PETN, tetryl and the like are exemplary of the base charge 13. A primer charge 14 is pressed in shell 11 superposed on charge 13 and is detonatable in response to heat as described hereinafter. Exemplary primer charges are diazodinitrophenol, mercury fulminate, lead azide, and the like. Superposed on primer charge 14 is lead tube 19 containing a single perforation 21 filled with fuse powder 22 as a core. A suitable ignition mixture 23 such as loose lead-selenium powder in stoichiometric proportions is superposed on tube 19. Ignition plug 25, formed, for example, from sulfur or plastic, is snugly fitted in shell 11 and superposed on ignition mixture 23, the shell being closed above the ignition plug by an asphalt waterproofing plug 26 and sulfur topping 27. Lead wires 28 and 29 extend from outside shell 11 through the sulfur topping, asphalt, and ignition plug so as to terminate in ignition mixture 23 and are connected at the terminated ends by bridgewire 31. The delay fuse powder 22 is a composition within the area B of FIG. 2 preferably within the area ABCDEFG of FIG. 15, and can be from 1.3 to 8.5 times shorter than the barium peroxide-selenium-tellurium delay fuse cores of the prior art selected to burn for the same time. Alternatively, the said core provides for a relatively longer burning time assuming the same length of core.

Although the delay fuse compositions of the invention are advantageously employed as a core in an electric blasting cap, as illustrated with reference to FIG. 16, they can be utilized in any initiator system, electric or non-electric, wherein a delay period is required intermediate the ignition and the ultimate charge to be initiated, the delay composition being operatively disposed intermediate the ignition and the said charge to burn over a predetermined period in response to the ignition and then by its burning at the end of the period, to initiate the said charge. Numerous such adaptations of ignition, delay fuse and ultimate charge are well known in delay systems of the art and can so utilize the delay fuse of the invention. In one such adaptation, a loose delay fuse composition of the invention is pressed, say at 2000–2500 p.s.i.g. on a primer charge, e.g., diazodinitrophenol, i.e., no core structure being required, and a loose ignition mixture then superposed on the pressed delay. Delay system assemblies, as is well known, need not be electric, although electric systems are generally preferred. Various well known precussion means can be utilized for initiating ignition and such can advantageously be utilized in conjunction with a delay fuse of the invention.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. A barium peroxide-selenium-tellurium delay fuse composition characterized by a burning time at least 10 percent longer than that characteristic of barium peroxide-selenium and barium peroxide-tellurium delay fuse mixtures having the same barium peroxide content, the said composition consisting of barium peroxide, selenium and tellurium in those relative proportions within the area ABCDEFG of FIG. 15 of the appended drawings.

2. A barium peroxide-selenium-tellurium delay fuse composition of claim 1 wherein the said relative proportions are within the area *abcdef* of the said FIG. 15.

3. A delay fuse composition of claim 2 wherein the barium peroxide content is 32 percent.

4. A delay fuse composition of claim 2 wherein the barium peroxide content is 35 percent.

5. A delay fuse composition of claim 2 wherein the barium peroxide content is 36 percent.

6. A delay fuse composition of claim 2 wherein the barium peroxide content is 37 percent.

7. A delay fuse composition of claim 2 wherein the barium peroxide content is 38 percent.

8. A delay fuse composition of claim 2 wherein the barium peroxide content is 39 percent.

9. A delay fuse composition of claim 2 wherein the barium peroxide content is 40 percent.

10. A delay fuse composition of claim 2 wherein the barium peroxide content is 41 percent.

11. A delay fuse composition of claim 2 wherein the barium peroxide content is 42 percent.

12. A delay initiator containing as the delay fuse a mixture consisting of barium peroxide, selenium and tellurium in those relative proportions within the area ABCDEFG of FIG. 15 of the appended drawings.

13. In an electric blasting cap containing a base charge detonatable in response to detonation of a primer charge described hereinafter, an ignition charge and means for igniting the said ignition charge, a primer charge intermediate said base charge and said ignition charge and detonatable as described hereinafter, a delay fuse operatively disposed intermediate said ignition charge and said primer charge and ignitable in response to ignition of said ignition charge, and said primer being detonatable in response to heat from burning of said delay fuse at the end of the burning period thereof, the improvement comprising as said delay fuse a composition consisting of barium peroxide, selenium and tellurium in those relative proportions within the area ABCDEFG of FIG. 15 of the appended drawings.

14. In an electric blasting cap of claim 13 the improvement comprising as said delay fuse a composition consisting of barium peroxide, selenium and tellurium in those relative proportions within the area *abcdef* of FIG. 15 of the appended drawings.

References Cited in the file of this patent

UNITED STATES PATENTS

| | | |
|---|---|---|
| Re. 19,661 | Nash | July 30, 1935 |
| 1,960,591 | Nash | May 29, 1934 |
| 2,761,386 | Zebree | Sept. 4, 1956 |
| 2,830,885 | Kerr et al. | Apr. 15, 1958 |

UNITED STATES PATENT OFFICE
CERTIFICATE OF CORRECTION

Patent No. 3,113,519                          December 10, 1963

David T. Zebree

It is hereby certified that error appears in the above numbered patent requiring correction and that the said Letters Patent should read as corrected below.

Column 1, line 46, for "lengths" read -- length --; column 2, line 27, strike out "time"; column 11, line 63, for "whilch" read -- which --; column 12, line 12, for "blastng" read -- blasting --; line 14, for "presed" read -- pressed --.

Signed and sealed this 5th day of May 1964.

(SEAL)
Attest:

ERNEST W. SWIDER

Attesting Officer                          EDWARD J. BRENNER
                                                 Commissioner of Patents